United States Patent
Gur et al.

(10) Patent No.: US 10,095,679 B2
(45) Date of Patent: Oct. 9, 2018

(54) REFERRING TO CELLS USING HEADER CELL VALUES

(71) Applicant: APPLE INC., Cupertino, CA (US)

(72) Inventors: Yaniv Gur, Pittsburgh, PA (US); Jay Christopher Capela, Santa Cruz, CA (US); Peter William Rapp, Pittsburgh, PA (US); Roger Rock Rosner, Mountain View, CA (US); Christopher Douglas Weeldreyer, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 14/846,610

(22) Filed: Sep. 4, 2015

(65) Prior Publication Data

US 2015/0378981 A1    Dec. 31, 2015

Related U.S. Application Data

(63) Continuation of application No. 11/890,785, filed on Aug. 6, 2007.

(51) Int. Cl.
*G06F 17/00* (2006.01)
*G06F 17/24* (2006.01)

(52) U.S. Cl.
CPC .......... *G06F 17/246* (2013.01); *G06F 17/245* (2013.01)

(58) Field of Classification Search
CPC .............................. G06F 17/245; G06F 17/246
See application file for complete search history.

(56) References Cited

U.S. PATENT DOCUMENTS

| | | | | | |
|---|---|---|---|---|---|
| 5,613,131 | A | * | 3/1997 | Moss | G06F 17/246 715/236 |
| 5,987,481 | A | * | 11/1999 | Michelman | G06F 17/246 715/219 |
| 7,127,672 | B1 | * | 10/2006 | Patterson | G06F 17/246 715/220 |
| 2001/0007988 | A1 | * | 7/2001 | Bauchot | G06F 17/246 |
| 2001/0049699 | A1 | * | 12/2001 | Pratley | G06F 17/245 715/212 |
| 2002/0055952 | A1 | * | 5/2002 | Clancey | G06F 17/247 715/219 |
| 2002/0158876 | A1 | * | 10/2002 | Janssen | G06F 17/245 345/504 |
| 2004/0199870 | A1 | * | 10/2004 | Anderson | G06F 17/2247 715/234 |
| 2006/0069696 | A1 | * | 3/2006 | Becker | G06F 17/246 |
| 2006/0117051 | A1 | * | 6/2006 | Chin | G06F 17/245 |
| 2008/0104091 | A1 | * | 5/2008 | Chin | G06F 17/30 |

(Continued)

OTHER PUBLICATIONS

Dixon, Helen. Excel 2007: Beyond the manual. Apress; 1st ed. edition (Mar. 21, 2007). Chapter 6, pp. 105-130.*

*Primary Examiner* — Nathan Hillery
(74) *Attorney, Agent, or Firm* — Fletcher Yoder PC

(57) ABSTRACT

Referring to cells using header cell values is disclosed. In some embodiments, a header cell value of a header cell is allowed to be used to refer to one or more other cells that are associated with the header cell. The header cell may be included in a header row or column included in a table. A header row cell value may be employed to refer to one or more other cells in a corresponding column, and a header column cell value may be employed to refer to one or more other cells in a corresponding row.

20 Claims, 16 Drawing Sheets

400

| | Speakers | Tables | =Tables*6 |
|---|---|---|---|
| Section1 | 2 | 4 | |
| Section2 | 2 | 6 | |
| Section3 | 2 | 5 | |
| Section4 | 2 | 4 | |

400

| | Speakers | Tables | Chairs |
|---|---|---|---|
| Section1 | 2 | 4 | 24 |
| Section2 | 2 | 6 | 36 |
| Section3 | 2 | 5 | 30 |
| Section4 | 2 | 4 | 24 |

(56) References Cited

U.S. PATENT DOCUMENTS

| | | | |
|---|---|---|---|
| 2008/0104498 A1* | 5/2008 | Molander | G06F 17/246 715/212 |
| 2008/0172597 A1* | 7/2008 | DeHaan | G06F 17/246 715/222 |
| 2008/0243823 A1* | 10/2008 | Baris | G06F 17/246 |
| 2012/0260153 A1* | 10/2012 | Bauchot | G06F 17/246 715/217 |
| 2014/0115434 A1* | 4/2014 | Chirilov | G06F 17/246 715/217 |
| 2014/0289600 A1* | 9/2014 | Bauchot | G06F 17/246 715/212 |

* cited by examiner

|  | Q1 | Q2 | Q3 | Q4 |
|---|---|---|---|---|
| Paris | $4,000,000.00 | $3,500,000.00 | $5,000,000.00 | $6,000,000.00 |
| Milan | $2,500,000.00 | $1,000,000.00 | $3,000,000.00 | $4,500,000.00 |
| London | $1,500,000.00 | $500,000.00 | $1,000,000.00 | $3,000,000.00 |
| NYC | $3,000,000.00 | $2,000,000.00 | $4,000,000.00 | $4,000,000.00 |
| Tokyo | $2,000,000.00 | $1,500,000.00 | $2,000,000.00 | $2,500,000.00 |
|  |  |  |  |  |

FIG. 1B

|  | A | B | C | D | E |
|---|---|---|---|---|---|
| 1 |  | Q1 | Q2 | Q3 | Q4 |
| 2 | Paris | $4,000,000.00 | $3,500,000.00 | $5,000,000.00 | $6,000,000.00 |
| 3 | Milan | $2,500,000.00 | $1,000,000.00 | $3,000,000.00 | $4,500,000.00 |
| 4 | London | $1,500,000.00 | $500,000.00 | $1,000,000.00 | $3,000,000.00 |
| 5 | NYC | $3,000,000.00 | $2,000,000.00 | $4,000,000.00 | $4,000,000.00 |
| 6 | Tokyo | $2,000,000.00 | $1,500,000.00 | $2,000,000.00 | $2,500,000.00 |
| 7 |  |  |  |  |  |

FIG. 1C

|  | Q1 | Q2 | Q3 | Q4 |
|---|---|---|---|---|
| Paris | $4,000,000.00 | $3,500,000.00 | $5,000,000.00 | $6,000,000.00 |
| Milan | $2,500,000.00 | $1,000,000.00 | $3,000,000.00 | $4,500,000.00 |
| London | $1,500,000.00 | $500,000.00 | $1,000,000.00 | $3,000,000.00 |
| NYC | $3,000,000.00 | $2,000,000.00 | $4,000,000.00 | $4,000,000.00 |
| Tokyo | $2,000,000.00 | $1,500,000.00 | $2,000,000.00 | $2,500,000.00 |
|  | =SUM(Q1) ✗ ✓ |  |  |  |

FIG. 1D

|  | Q1 | Q2 | Q3 | Q4 |
|---|---|---|---|---|
| Paris | $4,000,000.00 | $3,500,000.00 | $5,000,000.00 | $6,000,000.00 |
| Milan | $2,500,000.00 | $1,000,000.00 | $3,000,000.00 | $4,500,000.00 |
| London | $1,500,000.00 | $500,000.00 | $1,000,000.00 | $3,000,000.00 |
| NYC | $3,000,000.00 | $2,000,000.00 | $4,000,000.00 | $4,000,000.00 |
| Tokyo | $2,000,000.00 | $1,500,000.00 | $2,000,000.00 | $2,500,000.00 |
|  | $13,000,000.00 |  |  |  |

FIG. 1E

January — 206

| | Sales | |
|---|---|---|
| Bags | 25 | |
| Shoes | 30 | |

February — 207

| | Sales | |
|---|---|---|
| Bags | 12 | |
| Shoes | 45 | |

Specials — 208

| Save |
|---|
| 0.25 |
| 0.5 |

| 2007 | 2006 | |
|---|---|---|

January — 210

| | Sales | |
|---|---|---|
| Bags | 19 | |
| Shoes | 62 | |

February — 212

| | Sales | |
|---|---|---|
| Bags | 27 | |
| Shoes | 38 | |

March — 214

| | Sales | |
|---|---|---|
| Bags | 13 | |
| Shoes | 25 | |

| 2007 | 2006 | |
|---|---|---|

Figures 2C, 2D:
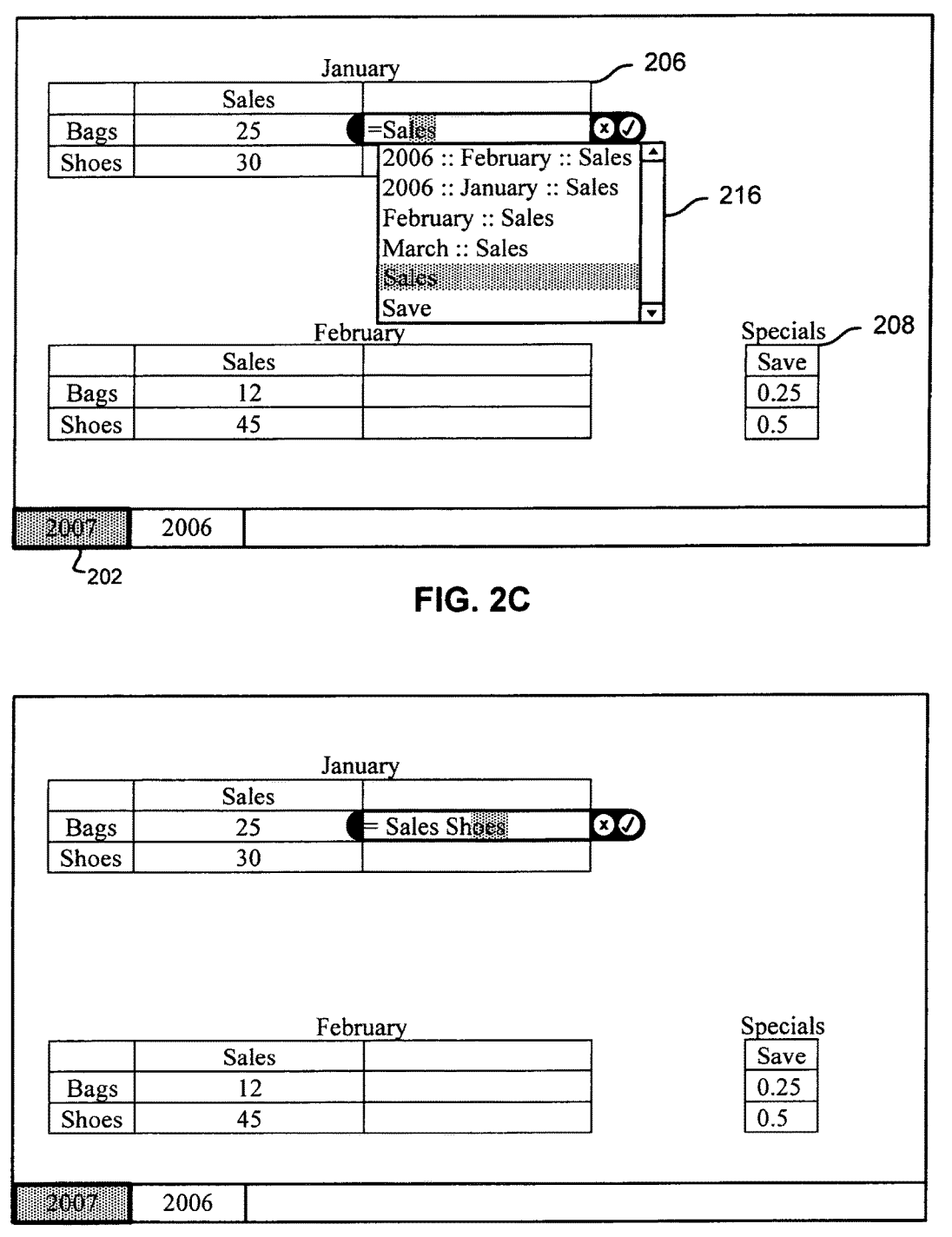

January

| | Sales | |
|---|---|---|
| Bags | 25 | =Sales ⊗✓ — 206 |
| Shoes | 30 | |

Dropdown (216):
- 2006 :: February :: Sales
- 2006 :: January :: Sales
- February :: Sales
- March :: Sales
- Sales
- Save February

| | Sales | |
|---|---|---|
| Bags | 12 | |
| Shoes | 45 | |

Specials — 208

| Save |
|---|
| 0.25 |
| 0.5 |

| 2007 | 2006 | |
|---|---|---|

January

| | Sales | |
|---|---|---|
| Bags | 25 | = Sales Shoes ⊗✓ |
| Shoes | 30 | |

February

| | Sales | |
|---|---|---|
| Bags | 12 | |
| Shoes | 45 | |

Specials

| Save |
|---|
| 0.25 |
| 0.5 |

| 2007 | 2006 | |
|---|---|---|

January

|  | Sales |  |
|---|---|---|
| Bags | 25 | =February |
| Shoes | 30 | 2006 :: February |
|  |  | February |

February

|  | Sales |  |
|---|---|---|
| Bags | 12 |  |
| Shoes | 45 |  |

Specials

| Save |
|---|
| 0.25 |
| 0.5 |

| 2007 | 2006 |

FIG. 2E

January

|  | Sales |  |
|---|---|---|
| Bags | 25 | =2006 |
| Shoes | 30 |  |

February

|  | Sales |  |
|---|---|---|
| Bags | 12 |  |
| Shoes | 45 |  |

Specials

| Save |
|---|
| 0.25 |
| 0.5 |

| 2007 | 2006 |

FIG. 2F

|  | Speakers | Tables | Chairs |
|---|---|---|---|
| Section1 |  |  |  |
| Section2 |  |  |  |
| Section3 |  |  |  |
| Section4 |  |  |  |

|  | =2 | ⓧ✓Tables | Chairs |
|---|---|---|---|
| Section1 | | | |
| Section2 | | | |
| Section3 | | | |
| Section4 | | | |

FIG. 4B

|  | Speakers | Tables | Chairs |
|---|---|---|---|
| Section1 | 2 | | |
| Section2 | 2 | | |
| Section3 | 2 | | |
| Section4 | 2 | | |

FIG. 4C

|  | Speakers | Tables | =Tables*6 |
|---|---|---|---|
| Section1 | 2 | 4 | |
| Section2 | 2 | 6 | |
| Section3 | 2 | 5 | |
| Section4 | 2 | 4 | |

FIG. 4D

|  | Speakers | Tables | Chairs |
|---|---|---|---|
| Section1 | 2 | 4 | 24 |
| Section2 | 2 | 6 | 36 |
| Section3 | 2 | 5 | 30 |
| Section4 | 2 | 4 | 24 |

FIG. 4E

|  | Red | Yellow | Blue |
|---|---|---|---|
| Squares |  |  |  |
| Circles |  |  |  |
| Triangles |  |  |  |
| Rectangles |  |  |  |

FIG. 5A

|  | Red | Yellow | = |
|---|---|---|---|
| Squares | 2 | 6 | |
| Circles | 5 | 0 | |
| Triangles | 8 | 4 | |
| Rectangles | 3 | 9 | |

FIG. 5B

|  | Red | Yellow | =Red |
|---|---|---|---|
| Squares | 2 | 6 | |
| Circles | 5 | 0 | |
| Triangles | 8 | 4 | |
| Rectangles | 3 | 9 | |

FIG. 5C

|  | Red | Yellow | =Red-1 |
|---|---|---|---|
| Squares | 2 | 6 | |
| Circles | 5 | 0 | |
| Triangles | 8 | 4 | |
| Rectangles | 3 | 9 | |

FIG. 5D

|  | Red | Yellow | Blue |
|---|---|---|---|
| Squares | 2 | 6 | 1 |
| Circles | 5 | 0 | 4 |
| Triangles | 8 | 4 | 7 |
| Rectangles | 3 | 9 | 2 |

FIG. 5E

|  | Red | Yellow | Blue |
|---|---|---|---|
| Squares | 5 | 7 | 9 |
| Circles |  |  |  |
| Triangles |  |  |  |
| = | ✗ ✓ |  |  |

FIG. 5F

|  | Red | Yellow | Blue |
|---|---|---|---|
| Squares | 5 | 7 | 9 |
| Circles |  |  |  |
| Triangles |  |  |  |
| =Squares | ✗ ✓ |  |  |

FIG. 5G

|  | Red | Yellow | Blue |
|---|---|---|---|
| Squares | 5 | 7 | 9 |
| Circles |  |  |  |
| Triangles |  |  |  |
| =Squares + 1 | ✗ ✓ |  |  |

FIG. 5H

|  | Red | Yellow | Blue |
|---|---|---|---|
| Squares | 5 | 7 | 9 |
| Circles |  |  |  |
| Triangles |  |  |  |
| Rectangles | 6 | 8 | 10 |

FIG. 5I

|          | Red | Yellow | Blue |
|----------|-----|--------|------|
| Squares  | 4   | 6      | 7    |
| Circles  | 8   | 3      | 2    |
| Triangles| 5   | 1      | =    |
| Rectangles| 9  | 4      |      |

FIG. 5J

|          | Red | Yellow | Blue |
|----------|-----|--------|------|
| Squares  | 4   | 6      | 7    |
| Circles  | 8   | 3      | 2    |
| Triangles| 5   | 1      | =Red Triangles |
| Rectangles| 9  | 4      |      |

FIG. 5K

|          | Red | Yellow | Blue |
|----------|-----|--------|------|
| Squares  | 4   | 6      | 7    |
| Circles  | 8   | 3      | 2    |
| Triangles| 5   | 1      | 5    |
| Rectangles| 9  | 4      |      |

FIG. 5L

|  | Red | Yellow | Blue |
|---|---|---|---|
| Squares | 4 | 6 | 7 |
| Circles | 8 | 3 | 2 |
| Triangles | 5 | 1 | 5 |
| Rectangles | 9 | 4 | =SUM( |

FIG. 5M

|  | Red | Yellow | Blue |
|---|---|---|---|
| Squares | 4 | 6 | 7 |
| Circles | 8 | 3 | 2 |
| Triangles | 5 | 1 | 5 |
| Rectangles | 9 | 4 | =SUM(Circles) |

FIG. 5N

|  | Red | Yellow | Blue |
|---|---|---|---|
| Squares | 4 | 6 | 7 |
| Circles | 8 | 3 | 2 |
| Triangles | 5 | 1 | 5 |
| Rectangles | 9 | 4 | =SUM(Circles)*2 |

FIG. 5O

|  | Red | Yellow | Blue |
|---|---|---|---|
| Squares | 4 | 6 | 7 |
| Circles | 8 | 3 | 2 |
| Triangles | 5 | 1 | 5 |
| Rectangles | 9 | 4 | 26 |

FIG. 5P

REFERRING TO CELLS USING HEADER CELL VALUES

CROSS-REFERENCE TO RELATED APPLICATION

This application is a continuation of U.S. application Ser. No. 11/890,785 entitled "Referring to Cells Using Header Cell Values," filed on Aug. 6, 2007, which is hereby incorporated by reference in its entirety for all purposes.

BACKGROUND OF THE INVENTION

In typical spreadsheet applications, cells are referred to or addressed using column (e.g., A, B, C, etc.) and row (e.g., 1, 2, 3, etc.) address tabs. Each cell is uniquely identified by a cell address that reflects the column and row address tabs, respectively, of the column and row in which the cell is located (e.g., A1). Headings or labels may be entered into one or more cells to give meaning to data included in a corresponding column or row. For example, if the cells of column A are to include revenue data, the top cell in the column (e.g., cell A1) may be labeled as "REVENUE".

BRIEF DESCRIPTION OF THE DRAWINGS

Various embodiments of the invention are disclosed in the following detailed description and the accompanying drawings.

FIG. 1B illustrates an embodiment of a table.

FIG. 1C illustrates an embodiment in which address tabs are provided with a table.

FIG. 1D illustrates an embodiment in which a header row cell value is employed to refer to a corresponding column of a table in a formula.

FIG. 1E illustrates the value resulting from the formula of FIG. 1D.

FIG. 2A illustrates an embodiment of a sheet of a document of a spreadsheet application.

FIG. 2B illustrates an embodiment of a sheet of a document of a spreadsheet application.

FIG. 2C illustrates an embodiment of the auto-completion of a column name.

FIG. 2D illustrates an embodiment of the auto-completion of a row name.

FIG. 2E illustrates an embodiment of the auto-completion of a table name.

FIG. 2F illustrates an embodiment of the auto-completion of a sheet name.

FIG. 4A illustrates an embodiment of a table.

FIG. 4B illustrates an embodiment of entering a formula into a header cell of a table.

FIG. 4C illustrates the values resulting from the formula of FIG. 4B.

FIG. 4D illustrates an embodiment of entering a formula into a header cell that includes a reference to another header cell.

FIG. 4E illustrates the values resulting from the formula of FIG. 4D.

FIG. 5A illustrates an embodiment of a table.

FIG. 5B illustrates an embodiment of entering a formula editing mode in a header row cell associated with a column of a table.

FIG. 5C illustrates an embodiment of inserting a reference to another column of a table in the formula of a host header row cell by clicking on a cell of that column.

FIG. 5D illustrates the completion of the formula of FIG. 5C.

FIG. 5E illustrates the values resulting from the formula of FIG. 5D.

FIG. 5F illustrates an embodiment of entering a formula editing mode in a header column cell associated with a row of a table.

FIG. 5G illustrates an embodiment of inserting a reference to another row of a table in the formula of a host header column cell by clicking on cells of that row.

FIG. 5H illustrates the completion of the formula of FIG. 5G.

FIG. 5I illustrates the values resulting from the formula of FIG. 5H.

FIG. 5J illustrates an embodiment of entering a formula editing mode in a cell of a table.

FIG. 5K illustrates an embodiment of inserting a reference to another cell of a table into the formula of a host cell by clicking on the cell.

FIG. 5L illustrates the value resulting from the formula of FIG. 5K.

FIG. 5M illustrates an embodiment of entering a formula editing mode in a cell of a table.

FIG. 5N illustrates an embodiment of inserting a reference to an entire row of a table into the formula of a host cell by clicking on the header cell of the row.

FIG. 5O illustrates the completion of the formula of FIG. 5N.

FIG. 5P illustrates the value resulting from the formula of FIG. 5O.

DETAILED DESCRIPTION

Figure 1A:
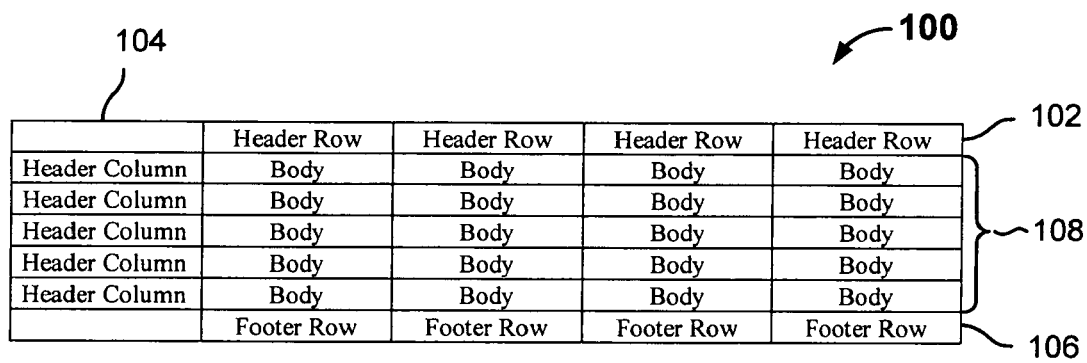
FIG. 1A illustrates an embodiment of a structure of a table.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Referring to cells using header cell values is disclosed. In some embodiments, a header cell value of a header cell is allowed to be used to refer to one or more other cells that are associated with the header cell. The header cell may be included in a header row or column included in a table. A header row cell value may be employed to refer to one or more other cells in a corresponding column, and a header column cell value may be employed to refer to one or more other cells in a corresponding row.

As used herein, the term "cell" refers to a cell associated with at least standard spreadsheet functionality. The term "at least standard spreadsheet functionality" in the context of a cell includes the ability to define the content of one cell in such a way that the content of the one cell is determined based at least in part on the content of one or more other cells, and the content of the one cell is updated automatically without further human action if the content of one or more of the one or more other cells is changed. As used herein, the term "host cell" refers to a cell in a formula editing mode, i.e., a cell into which a formula is being entered. In some embodiments, cells in a spreadsheet application are organized into one or more individual tables or table objects, each of which includes a desired number of rows and columns of cells. In such cases, a sheet of a spreadsheet document may include a desired number of table objects. Although in many of the examples described herein the cells of a spreadsheet application are organized into such table objects, the techniques described herein may be similarly employed with respect to other cell configurations or organizations, such as the (seemingly) infinite single grid or table of cells in each sheet of some typical spreadsheet applications that includes an unlimited (or very large) number of rows and columns of cells. Although many of the examples provided herein are with respect to a spreadsheet application, the techniques described herein may be similarly employed with respect to any application, spreadsheet or otherwise.

In some embodiments, one or more of a header row, header column, and footer row may be included in a table. FIG. 1A illustrates an embodiment of a structure of a table. In the given example, table 100 includes a header row 102, a header column 104, a footer row 106, and five rows and four columns of body cells 108. Using a header cell value, e.g., in a formula, to refer to or address one or more other cells associated with the header cell is disclosed. In some embodiments, a header row cell value can be employed to refer to one or more cells in a corresponding column of a table, and a header column cell value can be employed to refer to one or more cells in a corresponding row of a table. Any name or value may be entered into a header cell to refer to a corresponding column or row of cells. Header cell names or values can be selected to provide a more intuitive way to refer to the rows, columns, and/or cells of a table. In various embodiments, header cell values may be user defined, may be selected from a predefined list of values, etc. A table may include any combination of a header row, a header column, and a footer row, if any. Options may exist with respect to a table to include or hide (i.e. turn on or off) a header row, a header column, and/or a footer row. In some embodiments, footer row cells are employed to enter formulas. FIG. 1B illustrates an embodiment of a table 100 that includes a header row 102, a header column 104, and a footer row 106. In the given example, values have been entered into the header cells, and data has been entered into the body cells. In some embodiments, address tabs are provided with a table. FIG. 1C illustrates an embodiment in which address tabs are provided with table 100 of FIG. 1B.

In some embodiments, if specified, one or more header cell values can be used to refer to or address the rows, columns, and/or cells of a table in a manner analogous to address tabs. For example, with respect to FIGS. 1B and 1C, "Milan" can be used to refer to non-header cells in row 3 (i.e., cells B3 through E3), and "Q3" can be used to refer to the non-header cells in column D (i.e., in some embodiments cells D2 through D6 and in some embodiments cells D2 through D7). Similarly, "Milan Q3" or "Q3 Milan" can be used to refer to cell D3, i.e. the cell that is the intersection of row Milan and column Q3. In some embodiments, such as in the aforementioned example, a cell of a table can be referred to using the header row and column cell values with which it is associated. In some embodiments, one syntax used to make such a reference includes separating the associated row and column names by a space. In such cases, the space between the row and column (e.g., "Milan Q3") or column and row (e.g., "Q3 Milan") names implies an intersection between the associated row and column or column and row, respectively. In other embodiments, any appropriate syntax can be employed to refer to or specify cells using their associated row and column names. In some embodiments, cell ranges can be specified using header cell values similar to the manner in which cell ranges are specified using address tabs. For example, Paris Q1:London Q4 can be used to specify cell range B2:E4.

Address tabs may be displayed with respect to a table such as in FIG. 1C, and the rows, columns, and/or cells of the table may be referred to by corresponding address tabs even when a header row and/or column are included in a table and the associated header cell values are specified. In various embodiments, the rows, columns, and cells of a table may be referred to using any appropriate combination of header cell values (if specified) and/or address tabs, using any appropriate syntax. For example, body cell D3 in the example of FIG. 1C, in various embodiments, may be referred to as "D3", "3D", "D Milan", "Milan D", "3 Q3", "Q3 3", "Milan Q3", and "Q3 Milan". In some embodiments, options to turn on or off one or more dimensions of address tabs of a table are provided. For example, it may be desirable to turn off both (row and column) dimensions of address tabs of a table that includes a header row and column, such as depicted for table 100 in the example of FIG. 1B. Examples of situations in which a user may desire to turn off one or both of the column address tabs and row address tabs include where a header row and/or column is included and the user prefers to use the header row and/or column values to identify cells, for example because the user finds those names to be more intuitive or otherwise more useful and/or easier to use.

FIG. 1D illustrates an embodiment in which a header row cell value is employed to refer to a corresponding column of a table. In the example of FIG. 1D, header cell value "Q1" is used in the argument of the "SUM" function to specify the body cells of column Q1. The formula "=SUM(Q1)" is easier to enter and more intuitive than a corresponding formula that uses address tabs, i.e. "=SUM(B2:B6)" with respect to corresponding address tabs such as those depicted in FIG. 1C. FIG. 1E illustrates the value resulting from the formula of FIG. 1D. Although in the example of FIG. 1D a formula is entered into a cell of the footer row, a formula may be similarly entered into any cell of table 100. Other header cell values may be similarly employed to refer to the rows, columns, and/or cells of a table. For example, the total annual revenue for London can be computed using the formula "=SUM(London)", and the total fourth quarter European revenue can be computed using the formula "=Paris Q4+Milan Q4+London Q4". Such formulas that use header cell values are cleaner and more user-friendly than corresponding formulas that use address tabs, e.g., "=SUM (B4:E4)" and "=E2+E3+E4", respectively, with respect to corresponding address tabs such as those depicted in FIG. 1C.

In some embodiments, when used to refer to a corresponding column or row, a header cell value refers to only body cells associated with the corresponding column or row. For example, in the formula "=SUM(Q1)" in the example of FIG. 1D, the header cell value "Q1" refers to only the body cells of column Q1 and does not include the header cell or footer cell associated with column Q1. Similarly, in the formula "=SUM(London)", the header cell value "London" refers to only the body cells of row London and does not include the header cell associated with the row. Since when used to refer to a corresponding column or row a header cell value includes all body cells of the corresponding column or row, a column or row reference in a formula such as "Q1" in "=SUM(Q1)" or "London" in "=SUM(London)" does not have to be updated when an associated table is resized since the reference stays the same. For example, if additional rows of data associated with new locations were to be added to table 100 of FIG. 1E, the column reference "Q1" in formula "=SUM(Q1)" would not have to be updated as "Q1" would include all body cells of column Q1 including the added cells. Various advantages exist by having a header cell value refer to only associated body cells. For example, with the header cell value excluded, a header cell value such as "2007" does not interfere with an intended calculation or result. With footer row cells excluded, a formula such as "=SUM(Q1)" can be included in the same column Q1 without creating a circular reference.

Although using header cell values to refer to or address the rows, columns, and/or cells of a table when in a formula editing mode has been described in the given examples, header cell values can be similarly employed to refer to the rows, columns, and/or cells of a table in any other context such as, for example, when specifying source data when creating a chart or graph from data included in one or more tables.

As described above, the rows, columns, and/or cells of a table may be addressed or referred to using associated address tabs and/or header cell values. Like unique address tabs that are associated with each row and column, unique header cell values need to be selected for header cells included in a table to be able to uniquely identify the rows, columns, and/or cells of the table using associated header cell values. A spreadsheet document or file may include one or more sheets (or canvases), and each sheet (or canvas) may include one or more tables and/or other objects. In some embodiments, each table included in a sheet is uniquely named so that the rows, columns, and cells included in each table can be uniquely identified. In some embodiments, an option to show or hide the table name with a table is provided. For example, the table name is hidden in the examples of FIGS. 1B-1D, but table names are shown or unhidden in the examples of FIGS. 2A-2F. Since the name of each table in a sheet is unique, multiple tables on the same sheet may have one or more identical header cell values. Since each sheet of a spreadsheet document is uniquely named, multiple sheets of a spreadsheet document may have tables of the same name and possibly with one or more identical header cell values. The rows, columns, and/or cells of a table can be referred to in another table or object (e.g., a chart, graph, etc.) included in the same sheet or a different sheet of a spreadsheet document. In order to uniquely identify or refer to one or more rows, columns, and/or cells of a table in another table or object on the same sheet or on a different sheet, the associated table name and/or sheet name may be specified in addition to associated header cell value(s) (and/or address tab value(s)). A syntax employed in some embodiments to uniquely refer to a row, column, and cell of a table is provided in Table 1.

TABLE 1

| Table Component | Syntax |
|---|---|
| Row | <SheetName>::<TableName>::<RowName> |
| Column | <SheetName>::<TableName>::<ColumnName> |
| Cell | <SheetName>::<TableName>::<RowName><ColumnName> or <SheetName>::<TableName>::<ColumnName><RowName> |

In the syntax of Table 1, header cell and/or address tab values may be employed for the row name and column name parameters. In some embodiments, in the cases in which one or more address tab values are used for the row name and/or column name parameters in the syntax provided for a cell in Table 1, the space between the row name and column name parameters may be omitted. The sheet name and/or table name parameters may be included to uniquely refer to a row, column, or cell of a table. In various embodiments, the sheet name and/or table name parameters may be omitted if a row, column, and/or cell being referred to can be uniquely identified without one or more of those parameters. In some embodiments, when including a reference to a row, column, or cell of a table in a cell of the same table, the table name and/or sheet name parameters may be omitted; and when including a reference to a row, column, or cell of a table in a cell of a different table in the same sheet and/or in a different object in the same sheet, the sheet name parameter (and in some embodiments also the table name parameter, e.g., if the header cell value(s) in the reference are unique at least within the associated sheet) may be omitted. When including a reference to a row, column, or cell of a table in a cell of a different table in a different sheet and/or in a different object in a different sheet, in some embodiments, the sheet name parameter may be omitted, e.g., if an associated table name parameter that is included in the reference is unique across all sheets of a document, and in some embodiments the table name parameter may also be omitted if the header cell value(s) in the reference are unique across all tables (and/or other objects) in all sheets. In some embodiments, even though redundant and/or unnecessary, the sheet name and/or table name parameters may be included in a reference. In the cases in which the row name and/or column name parameters are specified using address tabs, the table name and/or sheet name may need to be specified. In some embodiments, a row, column, and/or cell of a table in one document can be referred to in another document by further including a document name parameter in a reference, e.g., by adding <DocumentName> to the syntax of Table 1. Table 1 provides one embodiment of a syntax that can be employed to uniquely identify or refer to the rows, columns, and cells of a table in a spreadsheet application. Any other appropriate syntax may be employed in other embodiments.

FIGS. 2A and 2B illustrate embodiments of two sheets, associated with tabs 202 and 204, respectively, of a document of a spreadsheet application. The sheet associated with tab 202, the contents of which are shown in FIG. 2A, is named "2007" and includes three tables: January 206, February 207, and Specials 208. The sheet associated with tab 204, the contents of which are shown in FIG. 2B, is named "2006" and also includes three tables: January 210, February 212, and March 214. In the given examples, each table in each sheet is uniquely named (January, February, Specials, March), but all tables except the Specials table 208 comprise the same table structure and include the same header cell values (Bags, Shoes, and Sales). Both sheets include tables named January and February. The rows, columns, and cells of any of the tables can be uniquely identified or referred to using a syntax such as the syntax of Table 1.

In some embodiments, while a user is entering or typing a sheet name, table name, row name, and/or column name, for example, when entering a reference in a formula using a syntax such as that provided in Table 1, auto-completion of the name being typed is available and/or provided. In the cases in which multiple potential matches exist for the name being typed, an interface that includes the potential matches is presented from which a desired value can be selected by the user. In various embodiments, the auto-completion feature is or can be configured to be available once a prescribed number of the first few characters of a name have been typed. In some embodiments, the auto-completion feature is automatically provided after a prescribed number of the first few characters of a name have been typed. In some embodiments, the auto-completion feature is provided in response to a user typing at least a prescribed number of the first few characters of a name followed by one or more arrow keys. In some embodiments, the auto-completion feature is available on the third keystroke (i.e. starting with the third character of a name), and if multiple matches exist, a drop down list of matching auto-completion options is provided. In some embodiments, an option to turn the auto-completion feature on or off is provided. In some embodiments, in addition to appending the completion of the name being typed, the auto-completion feature prepends extra information or identifiers such as a document name, sheet name, and/or table name, for example, to provide further disambiguation when the same (row, column, and/or table) name is used multiple times.

FIG. 2C illustrates an embodiment of the auto-completion of a column name. In the given example, the characters "Sa" are entered into a formula being entered into a cell of table 206 of sheet 202. The auto-completion feature is provided (e.g., automatically or in response to, for example, left or down arrow keystrokes by the user) starting with the third character of the name being entered. Since multiple potential matches exist in the given example, a list 216 of potential matches is provided from which a desired completion can be selected. In addition to appending completions, the auto-completion feature prepends additional parameters, such as the sheet name and/or table name in the example of FIG. 2C to distinguish the same column name ("Sales") used in different tables and/or sheets. The auto-completion feature provides the user with easy access to the Sales column in the same table (i.e. "Sales" in list 216), in other tables on the same sheet (i.e. "February::Sales" in list 216), and in other tables on different sheets (i.e. "2006::January::Sales", "2006::February::Sales", and "March::Sales" in list 216). Selection of "Sales" in list 216 results in the completion "les" to be appended to the entered characters "Sa".

In some embodiments, such as in the example of FIG. 2C, the sheet name is omitted if a table name appears only once in a document. Thus, in the given example, the sheet name "2006" is not included with "March::Sales" in list 216. In some embodiments, if a table name appears multiple times on different sheets of a document, the sheet name is included for a table that is not on the current sheet. In some embodiments, the sheet name is included for any table not on the current sheet. In such a case, "March::Sales" in list 216 would be "2006::March::Sales". In some embodiments, such as in the example of FIG. 2C, if a row or column name appears multiple times in different tables on a sheet, the table name is included for each table that is not the current table. Thus, in the given example, the table name "February" is included in "February::Sales" in list 216. In some embodiments, the table name is omitted if a row or column name appears only once in a sheet. Thus, in the given example, the table name "Specials" is not prepended to "Save" in list 216. In some embodiments, the table name is included for any row or column name not of the current table. In such a case, "Save" in list 216 would be "Specials::Save".

Although described with respect to a column name in FIG. 2C, the auto-completion feature is in various embodiments similarly available for row names, table names, and/or sheet names. FIG. 2D illustrates an embodiment of the auto-completion of a row name. In the example of FIG. 2D, since a single auto-completion match exists, it is provided inline. In some embodiments in the cases in which multiple potential matches exist such as in FIG. 2C, the most likely match is by default selected (i.e. highlighted) in an associated list, and the associated completion is appended to the entered characters inline. In some embodiments, such a most likely match is, for example, alphabetically selected from the one or more options associated with the current table and/or sheet. For example, in FIG. 2C, "Sales" may be by default selected since it is the only option with respect to the current table 206. Of course, in various embodiments, such a default selection may not be selected by a user who may opt to select a different option or may not select any of the provided options. FIG. 2E illustrates an embodiment of the auto-completion of a table name. FIG. 2F illustrates an embodiment of the auto-completion of a sheet name. In the example of FIG. 2F, a single match ("2006") exists because the sheet name of the current sheet ("2007") does not have to be (redundantly) specified in the current sheet.

Figure 3:
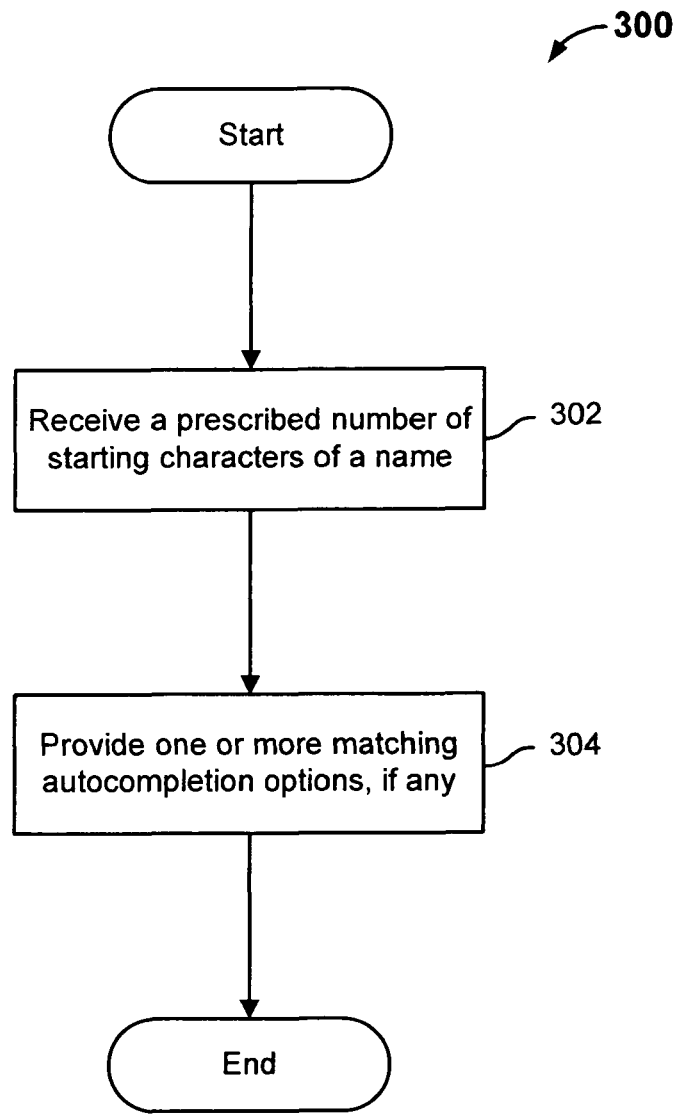
FIG. 3 illustrates an embodiment of a process for auto-completing a name.

FIG. 3 illustrates an embodiment of a process for automatically completing a remainder portion of a name as it is being entered. In some embodiments, process 300 is employed with respect to FIGS. 2C-2F. Process 300 starts at 302 at which at least a prescribed number of starting characters of a name (or other identifier) being entered are received. In some embodiments, the prescribed number of starting characters comprises the first two characters of the name. In some embodiments, the name is being entered into a host cell into which a formula is being entered as a reference name, e.g., in the formula, to refer to one or more other cells. In various embodiments, the name comprises one or more of a row name, column name, table name, sheet name, and document name. At 304, one or more matching auto-completion options, if any, are provided, and process 300 ends. In some embodiments, 304 includes determining a set of one or more valid reference names that begin with the received starting characters, if any, so that they can be provided at 304 as matching auto-completion options. In such cases, a valid reference name is one that identifies using a supported syntax (e.g., the syntax of Table 1) a spreadsheet document or a portion of a spreadsheet document and may include one or more of a row name, column name, table name, sheet name, and document name. One of the provided auto-completion options, if any, may be selected by a user to complete the name being entered.

Although an auto-completion feature is described with respect to entering a reference in a formula in the given examples, in various embodiments, the auto-completion feature may be available and can similarly be employed when entering names or references in any other context such as, for example, when specifying source data when creating a chart or graph. Although described with respect to table objects, such an auto-completion feature may be similarly employed with respect to the names of other types of objects or parts thereof that are included in a sheet of a spreadsheet application, such as charts, graphs shapes, images, graphics, multimedia content, etc.

In some embodiments, a formula may be entered into a header cell to populate the body cells of a corresponding row or column. FIGS. 4A-4E illustrate examples of entering formulas into header row cells to populate corresponding columns. FIG. 4A illustrates an embodiment of a table 400 that includes a header row 402 and a header column 404. FIG. 4B illustrates an embodiment of entering a formula into the Speakers header cell of table 400. Unlike other cell types, in some embodiments, a formula may be entered into a header cell even though the header cell includes a name or value (e.g., "Speakers", "Tables", "Section1", etc.). In some embodiments, a formula editing mode is entered with respect to a host cell (e.g., the Speakers header cell in the example of FIG. 4B) by clicking on or otherwise selecting the cell and entering an equals sign "=". As depicted, the formula "=2" is entered into the Speakers header cell. The resulting population of the body cells associated with the Speakers column of table 400 is shown in FIG. 4C. As illustrated, all cells of the Speakers column of table 400 are populated with the value "2". In some embodiments, a formula entered into a header cell may refer to one or more other header cells of the same dimension. In such cases, values of the body cells of the header cells that are referred to in the formula are employed in the computation of the values of corresponding body cells associated with the header cell into which the formula is being entered. FIG. 4D illustrates an embodiment of entering into a header cell a formula that includes a reference to another header cell. As depicted, the formula "=Tables*6" is entered into the Chairs header cell of table 400 and includes a reference to the Tables header cell. In some embodiments, the Tables reference is inserted into the formula by clicking on or otherwise selecting the Tables header cell (or an address tab associated with the Tables column) while in the formula editing mode in the Chairs header cell. Alternatively, the Tables references may be manually entered into the formula. The resulting population of the body cells associated with the Chairs column of table 400 due to the formula of FIG. 4D is shown in FIG. 4E. As illustrated, the value of each cell in each row of the Chairs column is the value of the cell in the corresponding row of the Tables column multiplied by six. In some embodiments, a formula entered into a header row cell only populates body cells of the associated column and does not populate a footer cell of the associated column if a footer row is included in the table. Although entering formulas into header row cells to populate the columns of a table is depicted in the given examples, similar techniques can be employed to enter formulas into header column cells to populate corresponding rows of a table. In such cases, a formula entered into a header column cell may include a reference to one or more other header column cells. In some embodiments, a formula is entered into a header cell into which a name or value has not (yet) been entered.

Formulas may be entered into different types of spreadsheet cells such as header cells, body cells, and footer cells. When in a formula editing mode in a host cell, references to one or more cells or cell ranges that are clicked on or otherwise selected while in the formula editing mode are inserted into the formula being entered into the host cell. As disclosed herein, in some embodiments, references to one or more cells or cell ranges that are clicked on or otherwise selected are added to a formula being entered into a host cell based on the zones (e.g., within an associated table) or types of the clicked cell(s) and/or the host cell. For example, in some embodiments, while in a formula editing mode in a header row cell associated with a column of a table, clicking on or otherwise selecting a cell that is in a different column results in the insertion of a reference to the header row cell associated with the selected cell in the formula of the host cell. Likewise, in some embodiments, while in a formula editing mode in a header column cell associated with a row of a table, clicking on or otherwise selecting a cell that is in a different row results in the insertion of a reference to the header column cell associated with the selected cell in the formula of the host cell. In some embodiments, a spreadsheet application can be configured such that clicking on or otherwise selecting one or more non-header cells while in a formula editing mode in a header cell results in the insertion of a reference to the selected cell(s) (e.g., rather than a reference to an associated row or column) in the formula being entered into the host cell. In some embodiments, when entering a formula into a body or footer cell, clicking on or otherwise selecting one or more other body and/or footer cells results in references to those cells being inserted into the formula being entered into the host cell but clicking on or otherwise selecting a header cell results in a reference to the entire row or column associated with the header cell to be inserted into the formula. In some such cases, the reference to the entire row or column includes only the body cells of the row or column. FIGS. 5A-5P illustrate examples of reference adding behavior based on the zones or types of the host cell and clicked cell(s).

FIG. 5A illustrates an embodiment of a table 500 that includes a header row 502 and a header column 504. FIG. 5B illustrates an embodiment of entering a formula editing mode in a header row cell associated with a column of table 500. As depicted in the example of FIG. 5B, a formula editing mode may be entered, for example, by clicking on or otherwise selecting header row cell Blue and entering an equals sign "=". FIG. 5C illustrates an embodiment of inserting a reference to another column of table 500 in the formula of host header cell Blue by clicking on a cell of that column. As depicted, a reference to header cell Red is inserted into the formula of host header cell Blue by clicking on cell Red Circles, a cell included in column Red. In the given example, a reference to the entire column (i.e. Red) of the clicked cell is inserted into the formula rather than a reference to the clicked cell (i.e. Red Circles) since the host cell is a header row cell. Completion of the formula being entered into header cell Blue of table 500 is depicted in FIG. 5D, and the resulting values of the cells of column Blue are depicted in FIG. 5E.

FIG. 5F illustrates an embodiment of entering a formula editing mode in a header column cell (Rectangles) associated with a row of table 500. FIG. 5G illustrates an embodiment of inserting a reference to another row of table 500 in the formula of host header cell Rectangles by selecting a range of cells of that row. As depicted, a reference to header cell Squares is inserted into the formula of host header cell Rectangles by selecting cells Yellow Squares and Blue Squares, cells included in row Squares. In the given example, a reference to the entire row (i.e. Squares) associated with the clicked cells is inserted into the formula rather than a reference to the clicked cell range (e.g., Yellow Squares:Blue Squares) since the host cell is a header column cell. Completion of the formula being entered into header cell Rectangles of table 500 is depicted in FIG. 5H, and the resulting values of the cells of row Rectangles are depicted in FIG. 5I.

FIG. 5J illustrates an embodiment of entering a formula editing mode in a non-header cell (Blue Triangles) of table 500. FIG. 5K illustrates an embodiment of inserting a reference to another cell of table 500 into the formula of host cell Blue Triangles by clicking on the cell. As depicted, a reference to cell Red Triangles is inserted into the formula of host cell Blue Triangles by clicking on cell Red Triangles. The value resulting from the formula entered into cell Blue Triangles of table 500 in FIG. 5K is depicted in FIG. 5L. In some embodiments, the behavior shown in this example (FIGS. 5J-5L) differs from that illustrated by FIGS. 5B-C, for example, because the formula is being entered into a cell that is not a header cell, which results in a reference to the particular cell that is selected, as opposed to a reference to the column (or row, in the case of a formula being entered in a header cell of a header column) in which the selected cell is located, to be inserted into the formula.

FIG. 5M illustrates an embodiment of entering a formula editing mode in a cell (Blue Rectangles) of table 500. FIG. 5N illustrates an embodiment of inserting a reference to an entire row of table 500 into the formula of host cell Blue Rectangles by clicking on the header cell of that row. As depicted, a reference to row Circles is inserted into the formula of host cell Blue Rectangles by clicking on header cell Circles. Completion of the formula being entered into host cell Blue Rectangles of table 500 is depicted in FIG. 5O, and the resulting value of cell Blue Rectangles is depicted in FIG. 5P.

Address tabs may be available and/or displayed with a table. In some embodiments, clicking on or otherwise selecting one or more address tabs while in a formula editing mode results in reference adding behavior similar to that described above with respect to header cells. For example, in some embodiments, while in a formula editing mode in a header row cell of a column of a table, clicking on or otherwise selecting an address tab of another column results in the insertion of a (header cell or address tab value) reference of the selected column into the formula being entered into the host cell. Likewise, in some embodiments, while in a formula editing mode in a header column cell of a row of a table, clicking on or otherwise selecting an address tab of another row results in the insertion of a (header cell or address tab value) reference to the selected row into the formula being entered into the host cell. In some embodiments, while in a formula editing mode in a body or footer cell, clicking on or otherwise selecting an address tab results in the insertion into the formula of the host cell of a (header cell or address tab value) reference to the row or column associated with the address tab. In some such cases, the reference to the row or column includes only the body cells of the row or column. In some embodiments, when not in a formula editing mode, clicking on or otherwise selecting an address tab results in the selection of an entire associated column or row, including the body cells, header cell, and/or footer cell associated with the column or row.

Figure 6:
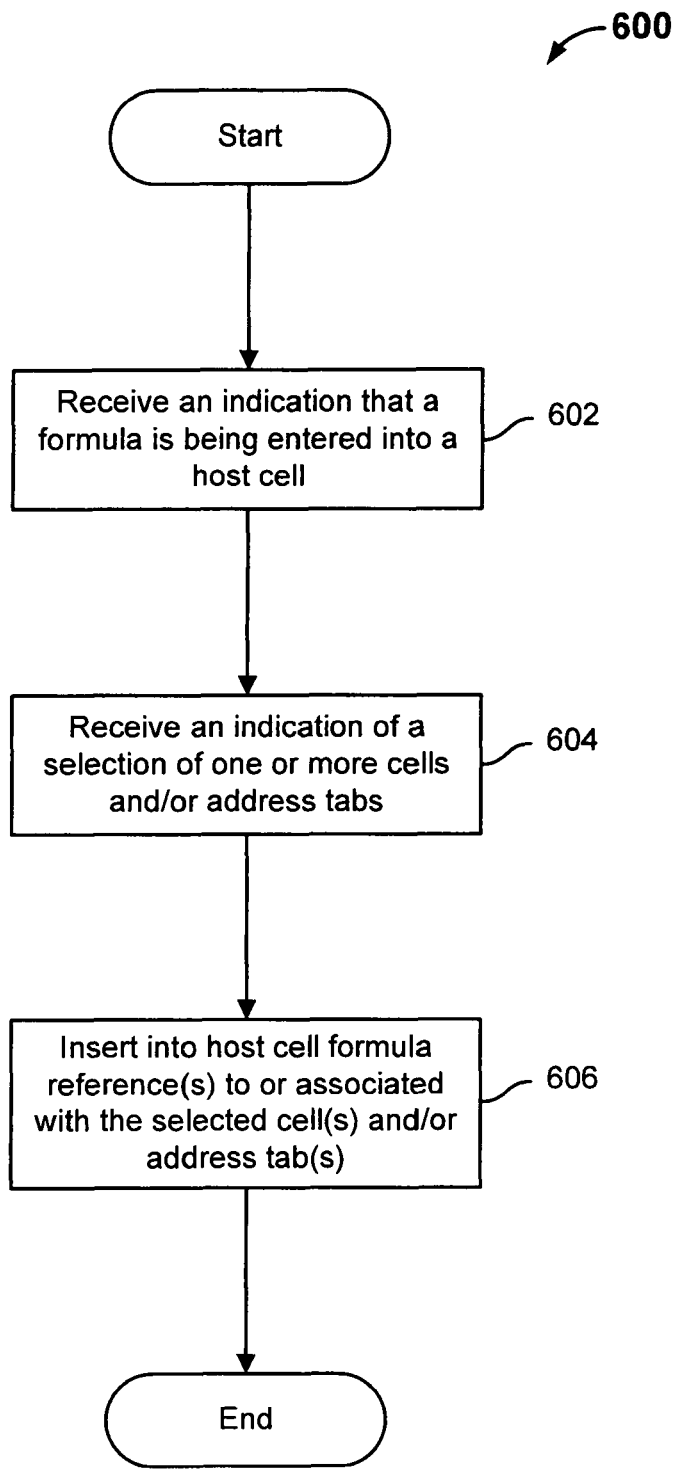
FIG. 6 illustrates an embodiment of a process for inserting references in a formula being entered into a host cell.

FIG. 6 illustrates an embodiment of a process for inserting references in a formula being entered into a host cell. In some embodiments, process 600 is employed with respect to FIGS. 5C, 5G, 5K, and 5N to insert a reference into a formula. Process 600 starts at 602 at which an indication that a formula is being entered into a host cell is received. In some embodiments, the indication that a formula is being entered is received at 602 in response to an equals sign "=" being entered into the host cell. In various embodiments, the host cell may be a body cell, a header cell, or a footer cell. At 604, an indication of a selection of one or more cells and/or address tabs is received. In various embodiments, the selection may comprise a set of contiguous (i.e. a range) or a set of non-contiguous cells. In various embodiments, the selected one or more cells may comprise header cells, body cells, footer cells, and/or address tabs. At 606, reference(s) to or associated with the cell(s) and/or address tab(s) selected at 604 are inserted into the formula being entered into the host cell, and process 600 ends. As described above, in some embodiments, the reference adding behavior of process 600 is based at least in part on the zones or types of the host cell and/or the clicked cells. For example, in some embodiments, in the cases in which the host cell comprises a header row/column cell, selecting an other row/column header cell or address tab results in the insertion of a (header cell or address tab) reference to the selected row/column into the formula of the host cell and selecting a body or footer cell results in the insertion of a (header cell or address tab) reference to the row/column associated with the selected body or footer cell into the formula of the host cell. In the cases in which the host cell comprises a body or footer cell, selecting a header cell or address tab results in the insertion of a (header cell or address tab) reference to the selected row/column into the formula of the host cell while selecting an other body or footer cell results in the insertion of a reference to the selected cell into the formula of the host cell.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method comprising:
receiving, via a processor, a selection of a first header cell in a table, wherein the first header cell is associated with a first set of cells that includes the first header cell and a first plurality of body cells;
entering, via the processor, a formula editing mode in the first header cell;
receiving, via the processor, an entry of a formula into the first header cell while in the formula editing mode, wherein the formula comprises a second header cell as an argument of the formula, wherein the second header cell is associated with a second set of cells that includes the second header cell and a second plurality of body cells; and
entering, via the processor, a modified formula into each of the first plurality of body cells, wherein the modified formula comprises the formula entered into the first header cell and replaces the second header cell with a reference to a corresponding body cell of the second plurality of body cells disposed in the same row or column as a respective body cell of the first plurality of body cells without overwriting the first header cell.

2. The method of claim 1, wherein the first header cell comprises a first column header cell, wherein the first set of cells comprises a first column of cells, wherein the second header cell comprises a second column header cell, wherein the second set of cells comprises a second column of cells.

3. The method of claim 1, wherein the first header cell comprises a first row header cell, wherein the first set of cells comprises a first row of cells, wherein the second header cell comprises a second row header cell, wherein the second set of cells comprises a second row of cells.

4. The method of claim 1, wherein the table comprises a footer row or column that includes a first footer cell as one of the cells in the first set of cells, wherein the modified formula is not entered into the first footer cell when the modified formula is entered into each of the first plurality of body cells.

5. The method of claim 1, wherein the first set of cells and the second set of cells of the table are configured to have spreadsheet functionality.

6. The method of claim 1, wherein receiving, via the processor, the entry of the formula comprises receiving a textual entry of a second header name of the second header cell as the argument of the formula.

7. The method of claim 1, wherein entering, via the processor, the modified formula into each of the first plurality of body cells occurs automatically upon receiving, via the processor, the selection of the first header cell in the table and entering, via the processor, the formula editing mode in the first header cell.

8. The method of claim 1, wherein entering, via the processor, the formula editing mode comprises receiving entry of an equal sign character in the first header cell.

9. A method comprising:
receiving, via a processor, a selection of a cell in a table, wherein the table comprises a first set of cells that includes a first header cell, a plurality of first body cells, and a first footer cell of the table;
entering, via the processor, a formula editing mode in the cell;
receiving, via the processor, an entry of a formula into the cell while in the formula editing mode, wherein the formula comprises a reference to the first header cell as an argument of the formula; and
entering, via the processor, the formula into the cell, wherein the reference to the first header cell in the formula is treated as a reference to a range comprising the first body cells, wherein the range does not include the first footer cell.

10. The method of claim 9, wherein the first set of cells comprises a first column of cells, wherein the first header cell comprises a first column header cell.

11. The method of claim 9, wherein the first set of cells comprises a first row of cells, wherein the first header cell comprises a first row header cell.

12. The method of claim 9, wherein the first header cell comprises a first header name, and wherein receiving, via the processor, the entry of the formula comprises receiving a textual entry of the first cell name as the argument of the formula.

13. The method of claim 9, wherein the first footer cell is disposed in a footer row of the table.

14. The method of claim 9, wherein entering, via the processor, the formula editing mode comprises receiving entry of an equal sign character in the first header cell.

15. One or more articles of manufacture comprising tangible, non-transitory machine-readable media comprising processor-executable instructions to:
receive an initial selection of a cell in a table, wherein the table comprises at least a first set of cells that includes a first header cell and a first plurality of body cells, wherein the cell is not one of the first plurality of body cells;
enter a formula editing mode in the cell to enable entry of a formula into the cell;
receive a subsequent selection of at least one of the first plurality of body cells while in the formula editing mode in the cell; and
in response to receiving the subsequent selection of the at least one of the first plurality of body cells while in the formula editing mode, enter an argument into the formula of the cell comprising a reference to at least the first header cell.

16. The one or more articles of manufacture of claim 15, wherein the table comprises a second set of cells, wherein the second set of cells includes a second plurality of body cells, and wherein the cell comprises one of the second plurality of body cells, wherein the first header cell comprises a column header cell of the table, wherein the argument comprises a second header cell, wherein the second header cell comprises a row cell of the table.

17. The method of claim 15, wherein the formula editing mode is entered by receiving entry of an equal sign character in the cell.

18. The one or more articles of manufacture of claim 15, wherein the table comprises a second set of cells that is parallel to the first set of cells, wherein the second set of cells includes a second header cell and a second plurality of body cells, and wherein the cell comprises the second header cell.

19. The one or more articles of manufacture of claim 18, wherein the first header cell comprises a first column header cell of the table, wherein the second header cell comprises a second column header cell of the table.

20. The one or more articles of manufacture of claim 18, wherein the first header cell comprises a first row header cell of the table, wherein the second header cell comprises a second row header cell of the table.

* * * * *

UNITED STATES PATENT AND TRADEMARK OFFICE
CERTIFICATE OF CORRECTION

PATENT NO. : 10,095,679 B2
APPLICATION NO. : 14/846610
DATED : October 9, 2018
INVENTOR(S) : Yaniv Gur et al.

Page 1 of 1

It is certified that error appears in the above-identified patent and that said Letters Patent is hereby corrected as shown below:

In the Claims

Claim 12, Column 14, Line 2, please replace "first cell name" with --first header name--.

Claim 17, Column 14, Line 35, please replace "method of claim 15" with --the one or more articles of manufacture of claim 15--.

Signed and Sealed this
Fourteenth Day of January, 2020

Andrei Iancu
*Director of the United States Patent and Trademark Office*